United States Patent [19]

Kifferstein

[11] 4,253,701

[45] Mar. 3, 1981

[54] DISPOSABLE BACK AND HEAD SHEET WITH USE DETECTOR

[76] Inventor: Harry P. Kifferstein, 27250 Harvard Rd., Southfield, Mich. 48076

[21] Appl. No.: 63,960

[22] Filed: Aug. 6, 1979

Related U.S. Application Data

[63] Continuation-in-part of Ser. No. 947,500, Oct. 2, 1978, Pat. No. 4,206,945.

[51] Int. Cl.³ .................................... A61G 15/00
[52] U.S. Cl. ............................. 297/220; 5/487; 116/207
[58] Field of Search ............... 297/220, 221, 222, 411; 116/206, 207, 216; 73/356, 358; 5/487

[56] References Cited

U.S. PATENT DOCUMENTS

| | | | |
|---|---|---|---|
| 2,068,571 | 1/1937 | Rotner | 297/221 |
| 2,156,880 | 5/1939 | Slomon | 116/207 |
| 3,654,059 | 4/1972 | Zisblatt | 297/220 |
| 3,951,133 | 4/1976 | Reese | 73/356 |
| 3,952,746 | 4/1976 | Summers | 116/206 |

FOREIGN PATENT DOCUMENTS

| | | | |
|---|---|---|---|
| 2529664 | 1/1976 | Fed. Rep. of Germany | 297/220 |
| 757202 | 10/1933 | France | 297/221 |

*Primary Examiner*—James T. McCall
*Attorney, Agent, or Firm*—Hauke and Patalidis

[57] ABSTRACT

A removable and disposable back and head sheet attachable by an edge to the top of a chair or seat back and draping over the front of the seat back for engagement with the back of the head of a person sitting in the chair or seat of a mass transportation vehicle. The head and back sheet of the invention is provided with an arrangement indicating clearly whether the sheet has been placed in use by or for a person having sat in the chair or seat such that another person intending to sit in the chair or seat is informed whether the back and head sheet is fresh or used, and the personnel in charge of cleaning the vehicle is enabled to change and replace only the sheets which have been used. The use or non-use of the back and head sheet is indicated by unfolding a fold, breaking a seal and unfolding a fold, or by any other indicator such as a detector of body heat, perspiration or the like.

9 Claims, 14 Drawing Figures

U.S. Patent     Mar. 3, 1981     4,253,701
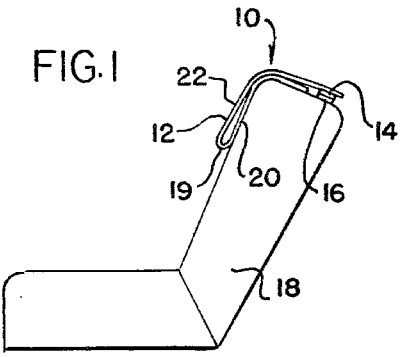
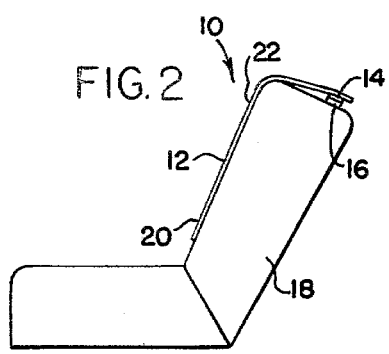
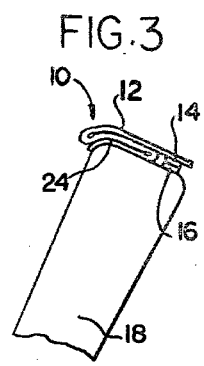
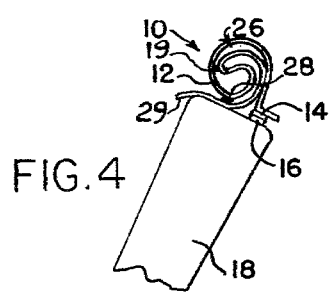
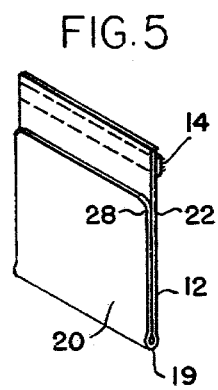
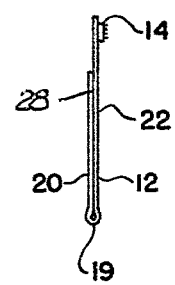
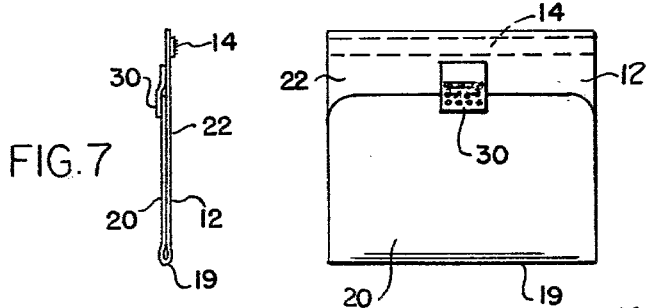
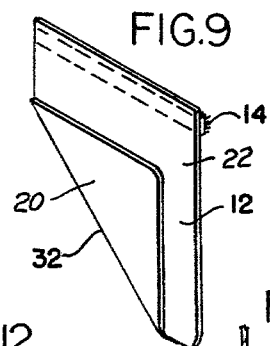
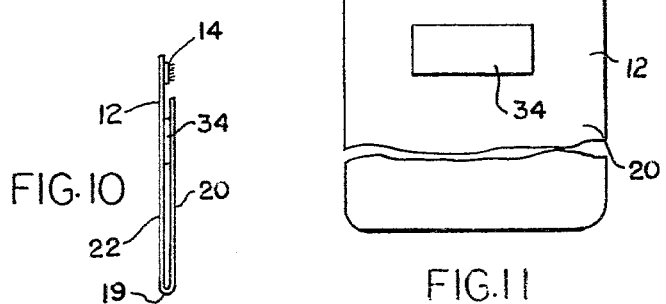
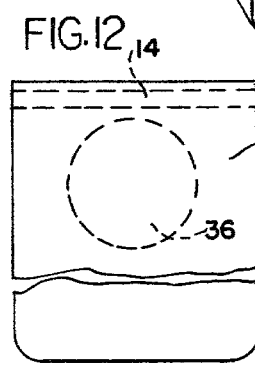
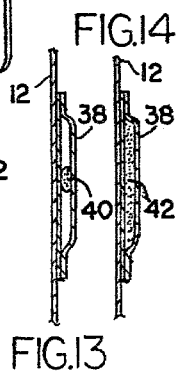

DISPOSABLE BACK AND HEAD SHEET WITH USE DETECTOR

CROSS-REFERENCE TO RELATED APPLICATIONS

The present application is a continuation-in-part of application Ser. No. 947,500, filed Oct. 2, 1978, for Back and Head Sheet now U.S. Pat. No. 4,206,945.

BACKGROUND OF THE INVENTION

The present invention relates to back and head sheets for draping over the front of seat backs, and more particularly for use as a cover for the seat back of mass transportation vehicles, such as railroad cars, buses and airplanes.

It is common practice to attach to the top of the back of the seat of a mass transportation vehicle a sanitary head sheet draped over the front of the seat back and forming a disposable clean and sanitary surface in engagement with the back of the head of a passenger sitting in the seat. Such head sheets are sometimes made of linen or fabric, are removed and laundered after each use, and re-used after being laundered and sanitized. More often, however, the head sheets are made of relatively inexpensive linen or fabric-like paper material, and they are removed by the person in charge of cleaning the vehicle after each use, or at least they are presumed to be changed after each use.

A problem involved with disposable back and head sheets for mass transportation vehicles is that a passenger does not have any assurance that the back and head sheet attached to the seat back which he occupies is a clean, unused back and head sheet. Another inconvenience is that the personnel in charge of cleaning the vehicle after each trip, or at the end of the day, do not know which seats have been occupied and which back and heat sheets must be removed and replaced by clean sheets. This leads to a temptation not to change the sheets or, in the alternative, to remove all the sheets, the clean ones as well as the used ones, and replace them by fresh head and back sheets.

The present invention, by providing more particularly throw-away disposable back and head sheets with use detection means, supplies a use indicator permitting a passenger in a mass transportation vehicle to ascertain the prior use or non-use of the head and back sheet draped over the back of the seat which he intends to occupy. In addition, the present invention provides an indicator of use and non-use of the back sheets supplying information to the cleaning personnel of a mass transportation vehicle relative to the seats which have been occupied and which require changing of the head and back sheets.

SUMMARY OF THE PRESENT INVENTION

The present invention accomplishes its purpose by providing a head and back sheet removably attachable to the front of a seat back and which is provided with a built-in use indicator in the form of a fold, a seal, or a body temperature or perspiration detector, or a combination thereof.

The diverse objects and advantages of the present invention will become apparent to those skilled in the art when the following description of examples of the best modes contemplated for practicing the invention is read in conjunction with the accompanying drawing wherein like numerals refer to like or equivalent parts, and in which:

BRIEF DESCRIPTION OF THE DRAWING

FIG. 1 is a schematic illustration of a vehicle seat provided with a back and head sheet according to the present invention;

FIG. 2 is a view similar to FIG. 1 but showing the back and head sheet of the invention during and after use;

FIGS. 3 and 4 are partial views similar to FIG. 1 and illustrating further modifications of the back and head sheet according to the present invention;

FIG. 5 is a perspective view of an example of back and head sheet according to the present invention;

FIGS. 6 and 7 are end views thereof showing alternate construction;

FIG. 8 is a front plan view of another example of back and head sheet according to the present invention;

FIG. 9 is a perspective view of a further modification thereof;

FIG. 10 is a side end view of an alternate configuration;

FIG. 11 is a rear plan view of the back and head sheet of FIG. 10 shown unfolded;

FIG. 12 is a front elevational view of a further modification thereof; and

FIGS. 13-14 are enlarged sections through another modification thereof.

DETAILED DESCRIPTION OF THE PREFERRED EMBODIMENTS

Referring to the drawing and more particularly to FIGS. 1 and 2 thereof, a head and back sheet 10 according to the present invention is made of a single sheet 12 of linen or fabric. Preferably, the head and back sheet 10 is made of a single sheet 12 of relatively low cost soft non-woven paper sheet material, or a combination of woven paper and plastic material, such as the material conventionally used for making the removable disposable head sheets for the seats of mass transportation vehicles. The sheet 12, which is illustrated in grossly exaggerated thickness in the drawing, is of generally square or rectangular shape and is provided at an edge with attachment means preferably consisting of a strip 14 of loop-type Velcro material for attachment to a complementary band of hook-type Velcro material 16 permanently attached to the top of a seat back 18. As shown at FIG. 1, the use detection means associated with the sheet 12 consists in a transverse fold 19 resulting from folding the sheet 12 substantially in half and disposing the bottom folded portion or flap 20 of the sheet below the exposed portion 22 such that the folded portion or flap 20 is normally frictionally engaged between the upper exposed portion 22 of the sheet and the surface of the front portion of the seat back 18. In order to place the head and back sheet 10 in use, the user pulls the folded portion or flap 20 such as to drape the whole sheet 12 over the front surface of the seat back 18, as illustrated at FIG. 2. Consequently, simple unfolding of the sheet 12 provides an indication that the sheet has been in use. Diverse manners of folding the sheet 12 may be used, in addition of the transverse fold 19 of FIG. 1, such as the double-fold or flap 24 of FIG. 3, a diagonal fold, an accordion-like fold, or the like. Alternatively, the sheet 12 may be rolled in the form of a simple scroll or preferably in the form of a double scroll, as shown at 26 at FIG. 4, as a result of folding the sheet 12 along a transverse fold 19 prior to rolling it upon itself in the form of a roll. Unrolling of the scroll indicates use of the sheet. A light adhesive, such as a weak rubber cement or the like, may be used, as shown at 28, to hold the scroll or roll 26 in position until it is desired to unroll it to cover the front surface of the seat back 18 by pulling on the free flap 29.

FIG. 5 illustrates an alternate example of head and back sheet according to the present invention wherein the sheet 12 is simply folded along a transverse fold 19 and held thus folded by means of a weak adhesive coating as shown at 28 at FIG. 6, the exposed portion being the folded over bottom portion 20 disposed in front of the top portion 22 of the sheet. As illustrated at FIGS. 7 and 8, the forwardly folded bottom portion or flap 20 of the sheet 12 may be held in position by an appropriate seal such as an easily-tearable or perforated paper seal 30. Such a seal may also be used for holding the scroll 26 of FIG. 4 in rolled position.

The fold needs not be transverse, as previously mentioned, and may be any fold which is convenient, such as a diagonal fold 32, FIG. 9. In addition to folding a portion of the sheet 12, or as an alternate to folding the sheet, means such as body temperature detectors or body perspiration detectors are contemplated by the present invention to indicate use or non-use of the sheet 12 forming a head and back sheet 10. FIG. 10 illustrates an example of a sheet 12 which, in addition to being transversely folded as shown at 19, is provided with a small rectangular patch 34, preferably disposed on the rear surface of the sheet 12 to remain normally non-visible, as best shown at FIG. 11. The patch 34 consists of a small rectangular piece of cellophane or like material applied to the rear surface of the sheet 12 and which is coated on its inside surface with an appropriate dye adapted to change color at body temperature. Examples of such temperature sensitive dyes are ethyl stearate and other chemical compounds, as disclosed in U.S. Pat. Nos. 2,614,430, 2,308,087 and 3,677,088, for example. Instead of being placed on the back of the sheet 12 in the form of a cellophane, or the like, patch 34, a portion of the exposed area of the sheet 12 may, in the alternative, be impregnated with a temperature sensitive dye, as long as the dye is proven to be non-irritating to the skin. It will be appreciated that the area which is provided with the temperature detector is the area most likely to be engaged with the back of the head of a person sitting in the seat. In the alternative, the temperature sensitive material may be replaced by a dye sensitive to body perspiration, such as phenolphthalein, thymolphtalein, M Cresol Purple, Thymol Blue, Methyl Red, and any other known chemical or mixtures thereof, as mentioned for example in U.S. Pat. No. 2,156,880. The body perspiration dye, in solution in an appropriate solvent, is used to impregnate at least a portion of the sheet 12, as shown at 36 at FIG. 12, and the solvent is allowed to evaporate.

Use of the head and back sheet of the invention may also be detected by means of a pressure detector for giving an indication that a pressure has been applied upon the back and head sheet by a person sitting in the seat. A simple pressure detector is illustrated in section at FIG. 13 in the form of a pouch 38 made of pliable transparent strong plastic material, such as cellophane and the like, attached by an adhesive to the back of the sheet 12 and in which is disposed a frangible capsule 40 containing a liquid dye. Pressure applied to the sheet 12 by the back or the head of a person sitting on the seat over the back of which the sheet 12 is draped crushes the frangible capsule 40 and causes the liquid dye to spread within the pouch 38, as shown at 42 at FIG. 14, thus giving an indication that the sheet 12 has been used.

It will be appreciated that, preferably, some information may be printed on the edge or on the rear side, when visible, of the folded flap of the sheet to provide the user with directions on how to use the back and head sheet of the invention for unfolding or unrolling, or the like.

It will be further appreciated that, if so desired, a plurality of means permitting detection of the use of a back and head sheet may be used in combination, such as a fold with or without tearable seals, body heat detection dyes and body perspiration detection dyes, pressure responsive elements and many modifications, as will become apparent to those skilled in the art, are within the purview of the present invention.

What is claimed as novel is:

1. A removable disposable head and back sheet for attaching to the top of a seat back and for draping over the front of said seat back, said head and back sheet comprising a sheet of soft pliable material, means at an edge of said sheet for attaching to said seat back top, and means integral with said sheet for indicating use of said sheet by a person sitting in said seat, wherein said indicating means comprises a portion of said sheet rolled in the form of a scroll disposed below said attaching means and requiring unrolling prior to draping said sheet over the front of said seat back.

2. A removable disposable head and back sheet for attaching to the top of a seat back and for draping over the front of said seat back, said head and back sheet comprising a sheet of soft pliable material, means at an edge of said sheet for attaching to said seat back top, and means integral with said sheet for indicating use of said sheet by a person sitting in said seat, wherein said indicating means comprises a portion of said sheet folded over and requiring unfolding prior to draping said sheet over the front of said seat back.

3. The head and back sheet of claim 1 further comprising a weak adhesive holding said scroll in rolled position.

4. The head and back sheet of claim 2 further comprising a weak adhesive holding said portion folded in position.

5. The head and back sheet of claim 1 further comprising a tearable seal holding said scroll in rolled position.

6. The head and back sheet of claim 2 further comprising a tearable seal holding said portion folded in position.

7. A removable disposable head and back sheet for attaching to the top of a seat back and for draping over the front of said seat back, said head and back sheet comprising a sheet of soft pliable material, means at an edge of said sheet for attaching to said seat back top, and means integral with said sheet for indicating use of said sheet by a person sitting in said seat, wherein said indicating means comprises body temperature detecting means at a portion of said sheet normally engageable with the back of the head of a person sitting in said seat.

8. A removable disposable head and back sheet for attaching to the top of a seat back and for draping over the front of said seat back, said head and back sheet comprising a sheet of soft pliable material, means at an edge of said sheet for attaching to said seat back top, and means integral with said sheet for indicating use of said sheet by a person sitting in said seat, wherein said indicating means comprises body perspiration detection means at a portion of said sheet normally engageable with the back of the head of a person sitting in said seat.

9. A removable disposable head and back sheet for attaching to the top of a seat back and for draping over the front of said seat back, said head and back sheet comprising a sheet of soft pliable material, means at an edge of said sheet for attaching to said seat back top, and means integral with said sheet for indicating use of said sheet by a person sitting in said seat, wherein said indicating means comprises pressure detection means at a portion of said sheet normally engageable with the back portion of the body of a person sitting in said seat, said pressure detection means comprising a pouch of pliable transparent plastic attached to the back of said sheet, a frangible capsule disposed in said pouch and a liquid dye contained in said frangible capsule, whereby said capsule is broken by pressure applied on said sheet and said dye is caused to flow and spread in said pouch.

* * * * *